US012766527B2

(12) United States Patent
Zolotukhin

(10) Patent No.: US 12,766,527 B2
(45) Date of Patent: Oct. 20, 2026

(54) REVERSIBLE HYDRAULIC NOZZLE

(71) Applicant: PULSE NEEDLEFREE SYSTEMS, INC., Lenexa, KS (US)

(72) Inventor: Mikhail Zolotukhin, Shawnee, KS (US)

(73) Assignee: PULSE NEEDLEFREE SYSTEMS, INC., Lenexa, KS (US)

( * ) Notice: Subject to any disclaimer, the term of this patent is extended or adjusted under 35 U.S.C. 154(b) by 326 days.

(21) Appl. No.: 18/287,309

(22) PCT Filed: Apr. 19, 2022

(86) PCT No.: PCT/US2022/025286
§ 371 (c)(1),
(2) Date: Oct. 18, 2023

(87) PCT Pub. No.: WO2022/225882
PCT Pub. Date: Oct. 27, 2022

(65) Prior Publication Data

US 2024/0189839 A1 Jun. 13, 2024

Related U.S. Application Data

(60) Provisional application No. 63/176,597, filed on Apr. 19, 2021.

(51) Int. Cl.
*B05B 1/16* (2006.01)
*B05B 15/531* (2018.01)
(Continued)

(52) U.S. Cl.
CPC .............. *B05B 1/16* (2013.01); *B05B 15/531* (2018.02); *B05B 15/534* (2018.02); *B05B 15/555* (2018.02); *B05B 15/65* (2018.02)

(58) Field of Classification Search
CPC ....... B05B 1/16; B05B 15/531; B05B 15/534; B05B 15/555; B05B 15/65
(Continued)

(56) References Cited

U.S. PATENT DOCUMENTS 3,563,463 A 2/1971 Walker
4,074,857 A * 2/1978 Calder .................... B05B 1/28
239/119

(Continued)

FOREIGN PATENT DOCUMENTS

WO 2020/214621 A1 10/2020

OTHER PUBLICATIONS

European Search Report and Written Opinion, Europe Patent Application No. 22792285.3, dated Feb. 3, 2025, 8 pages, European Patent Office, Munich, Germany.

(Continued)

*Primary Examiner* — Steven J Ganey
(74) *Attorney, Agent, or Firm* — STINSON LLP

(57) ABSTRACT

In a first aspect, the present invention is directed to a reversible hydraulic nozzle that includes a front body section, which includes a hydraulic orifice, and a rear body section, which includes a rear opening. The reversible hydraulic nozzle is configured to be in fluid communication with an outlet valve of a hydraulic device in each of a dispensing orientation and a cleaning orientation. In a second aspect, the present invention is directed to a hydraulic device that includes an outlet valve and the reversible hydraulic nozzle of the first aspect of the present invention. The present invention is further directed to using a needle-free injection device that includes the reversible hydraulic nozzle of the first aspect of the invention to perform a method of injection and a method of cleaning the reversible hydraulic nozzle.

19 Claims, 11 Drawing Sheets

(51) Int. Cl.
*B05B 15/534* (2018.01)
*B05B 15/555* (2018.01)
*B05B 15/65* (2018.01)

(58) Field of Classification Search
USPC .................................................. 239/119, 600
See application file for complete search history.

(56) References Cited

U.S. PATENT DOCUMENTS

| | | | | |
|---|---|---|---|---|
| 4,108,379 | A | | 8/1978 | Talley |
| 4,157,163 | A | * | 6/1979 | Pinto .................... B05B 15/534<br>239/119 |
| 4,513,913 | A | | 4/1985 | Smith |
| 4,654,141 | A | | 3/1987 | Frentzel |
| 5,820,025 | A | | 10/1998 | Troudt |
| 5,947,381 | A | | 9/1999 | Carey |
| 7,029,457 | B2 | | 4/2006 | Rogatchev et al. |
| 8,840,046 | B2 | | 9/2014 | Jones et al. |
| 2006/0006251 | A1 | | 1/2006 | Carey et al. |
| 2006/0287631 | A1 | | 12/2006 | Leon et al. |

OTHER PUBLICATIONS

International Search Report and Written Opinion for related PCT/US2022/025286 dated Jul. 18, 2022 (12 pgs).

* cited by examiner

REVERSIBLE HYDRAULIC NOZZLE

CROSS-REFERENCE TO RELATED APPLICATIONS

This application is based on and claims priority to U.S. Provisional Application Ser. No. 63/176,597 filed on Apr. 19, 2021, which is hereby incorporated herein by reference.

BACKGROUND OF THE INVENTION

1. Field of the Invention

The invention relates to the field of hydraulic devices and nozzles for use with the same.

2. Description of Related Art

Hydraulic orifices are commonly required in various applications, including high-pressure washers and water jet metal-cutting manufacturing tools. Hydraulic orifices are also required in needle-free injections systems where liquid is pressurized and expelled through a small hydraulic orifice to create a fine jet injection stream capable of penetrating the skin of human or animal tissues. Examples of needle-free injection systems with hydraulic orifices are the Pulse 250™ manufactured by Pulse NeedleFree Systems, Inc., and the invention disclosed in U.S. Pat. No. 7,029,457. The nozzle's hydraulic orifice is a critical component of needle-free injection systems because the liquid injectate takes the shape of the hydraulic orifice as the liquid is expelled, and this fine shape is important to the force and quality of the liquid injection stream.

Many needle-free injectors use an outlet valve to prevent air from entering the injector when filling the injector with medicine. Upon actuation, the liquid flows through the outlet valve and then through the nozzle containing a hydraulic orifice and into the subject. In these applications, it is important that the nozzle with the hydraulic orifice has a watertight connection with the outlet valve so that the liquid has only one route of exit, which is through the nozzle's hydraulic orifice. This watertight connection is especially important in needle-free injection systems where liquid is often pressurized to over 700 bars. Accordingly, at these high pressures, needle-free injection systems will often require the use of tools to tightly secure the outlet valve to the nozzle.

The hydraulic orifices used in needle-free injection devices are very small, commonly smaller than one-half of a millimeter. Because the hydraulic orifices are so small, they are prone to clogging or partial clogging if debris enters the hydraulic orifice. This debris may be dirt, loose materials from the injection device or rubber from medicine vials. When this debris reaches the nozzle's hydraulic orifice, it may block the orifice and prevent liquid from being expelled from the device. Alternatively, the debris may partially block the hydraulic orifice and alter the injection stream as the liquid flows through hydraulic orifice. Further, because the orifice is so small, when debris obstructs the hydraulic orifice, it is difficult for an operator to remove this debris from the hydraulic orifice. Typically, substantial disassembly of the device would be required, followed by use of a microscope to view the hydraulic orifice and the use of precise tools to remove the debris without damaging the hydraulic orifice. In many remote settings, including livestock farms, it is impractical to implement complex hydraulic orifice cleaning methods.

BRIEF SUMMARY OF THE INVENTION

In a first aspect, the present invention is directed to a reversible hydraulic nozzle. The reversible hydraulic nozzle includes a front body section, which includes a hydraulic orifice, and a rear body section, which includes a rear opening. The reversible hydraulic nozzle is configured to be in fluid communication with an outlet valve of a hydraulic device in each of a dispensing orientation and a cleaning orientation.

Preferably, the hydraulic orifice has a first diameter, and the rear opening has a second diameter. More preferably, the second diameter is larger than the first diameter.

Preferably, the rear body section is configured to be more proximal to the outlet valve than the front body section in the dispensing orientation. More preferably, the rear body section is configured to be in contact with the outlet valve of the hydraulic device in the dispensing orientation. Most preferably, the rear body section is configured to be slidably positioned within the outlet valve of the hydraulic device in the dispensing orientation. In certain embodiments, the rear body section is configured to be slidably positioned over the outlet valve of the hydraulic device in the dispensing orientation.

Preferably, the front body section is configured to be more proximal to the outlet valve than the rear body section in the cleaning orientation. More preferably, the front body section is configured to be in contact with the outlet valve of the hydraulic device in the cleaning orientation. Most preferably, the front body section is configured to be slidably positioned within the outlet valve of the hydraulic device in the cleaning orientation. In certain embodiments, the front body portion is configured to be slidably positioned over the outlet valve of the hydraulic device in the cleaning orientation.

Preferably, a front width of the front body section is substantially the same as a rear width of the rear body section. Preferably, the reversible hydraulic nozzle is generally cylindrical, and a front diameter of the front body section is substantially the same as a rear diameter of the rear body section.

Preferably, the first diameter is from about 0.1 to 1.0 mm. More preferably, the diameter is from about 0.1 to 0.5 mm. Most preferably, the diameter is from about 0.2 to 0.4 mm. In certain embodiments, a ratio of the second diameter to the first diameter is about 5:1 to 10:1. In other embodiments, a ratio of the second diameter to the first diameter is about 15:1 to 20:1.

Preferably, a portion of the reversible hydraulic nozzle is configured to engage with a fastener of the hydraulic device in order that the fastener restricts movement of the reversible hydraulic nozzle relative to the outlet valve in each of the dispensing orientation and the cleaning orientation. More preferably, the reversible hydraulic nozzle includes a flange section positioned between the front body section and the rear body section. The flange section is configured to engage with a fastener of the hydraulic device in order that the fastener restricts movement of the reversible hydraulic nozzle relative to the outlet valve in each of the dispensing orientation and the cleaning orientation. Preferred fasteners, include, but are not necessarily limited to: retention nuts; retaining pins, and ball locks. Most preferably, the fastener is a retention nut.

Preferably, the hydraulic device is selected from the group consisting of high-pressure washers, water jet metal-cutting manufacturing tools, aerosol spray devices, and needle-free injection devices. Most preferably, the hydraulic device is a needle-free injection device.

In a second aspect, the present invention is directed to a hydraulic device that includes an outlet valve and the reversible hydraulic nozzle of the first aspect of the present invention.

Preferably, the hydraulic device of the second aspect of the invention includes a seal configured to create a sealed connection between the reversible hydraulic nozzle and the outlet valve in each of the dispensing orientation and the cleaning orientation. Preferably, the reversible hydraulic nozzle is configured to abut the seal, and the seal is configured to abut the outlet valve in each of the dispensing orientation and the cleaning orientation. In certain embodiments, the seal is fixedly attached to the outlet valve. In other embodiments, the seal is not fixedly attached to the outlet valve. Preferably, the rear body section of the reversible hydraulic nozzle is configured to be slidably positioned within the seal in the dispensing orientation. Preferably, the seal is configured to be positioned between the rear body section and a seal retaining wall of the outlet valve in the dispensing orientation. Preferably, the front body section of the reversible hydraulic nozzle is configured to be slidably positioned within the seal in the cleaning orientation. Preferably, the seal is configured to be positioned between the front body section and a seal retaining wall of the outlet valve in the cleaning orientation. Preferably, the seal is selected from the group consisting of a u-cup, seals, quad seals, O-rings, and combinations thereof.

Preferably, the hydraulic device of the second aspect of the invention includes a fastener configured to restrict movement of the reversible hydraulic nozzle of the first aspect of the invention relative to the outlet valve in each of the dispensing orientation and the cleaning orientation. Preferably, the fastener is selected from the group consisting of a retention nut, a retaining pin, and a ball lock. Most preferably, the fastener is a retention nut.

Preferably, the hydraulic device is selected from the group consisting of high-pressure washers, water jet metal-cutting manufacturing tools, aerosol spray devices, and needle-free injection devices.

In a third aspect, the present invention is directed to a method of performing an injection with a needle-free injection device of the second aspect of the present invention, wherein the reversible hydraulic nozzle is positioned in the dispensing orientation. The method includes the following steps: pressing the front body section of the reversible hydraulic nozzle against a subject to be injected: and injecting an injectate into the subject to be injected.

In a fourth aspect, the present invention is directed to a method of cleaning the reversible hydraulic nozzle of the needle-free injection device of the second aspect of the present invention, wherein the reversible hydraulic nozzle is positioned in the cleaning orientation. The method includes the following steps: actuating the needle-free injection device in order to pass a fluid from the outlet valve of the injection device and into the hydraulic orifice.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

Certain aspects of the invention will now be described with respect to the exemplary embodiments depicted in the figures, but are not limited to such embodiments.

Figure 1:
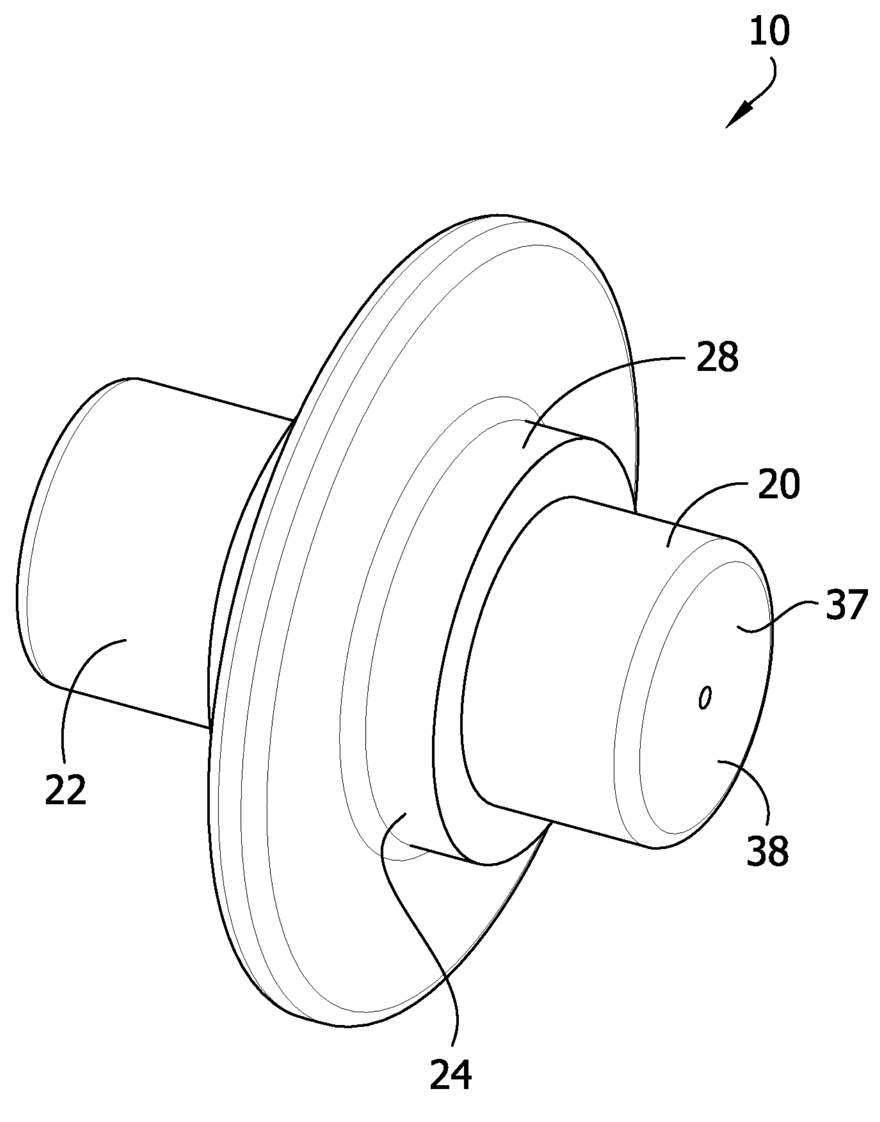
FIG. 1 is a perspective view of an exemplary embodiment of the reversible hydraulic nozzle 10 of one aspect of the present invention.

In one aspect, the present invention is directed to a reversible hydraulic nozzle. The reversible hydraulic nozzle is configured to be in fluid communication with an outlet valve of a hydraulic device in each of a dispensing orientation and a cleaning orientation. An exemplary reversible hydraulic nozzle 10 is shown in FIG. 1.

Figure 2:
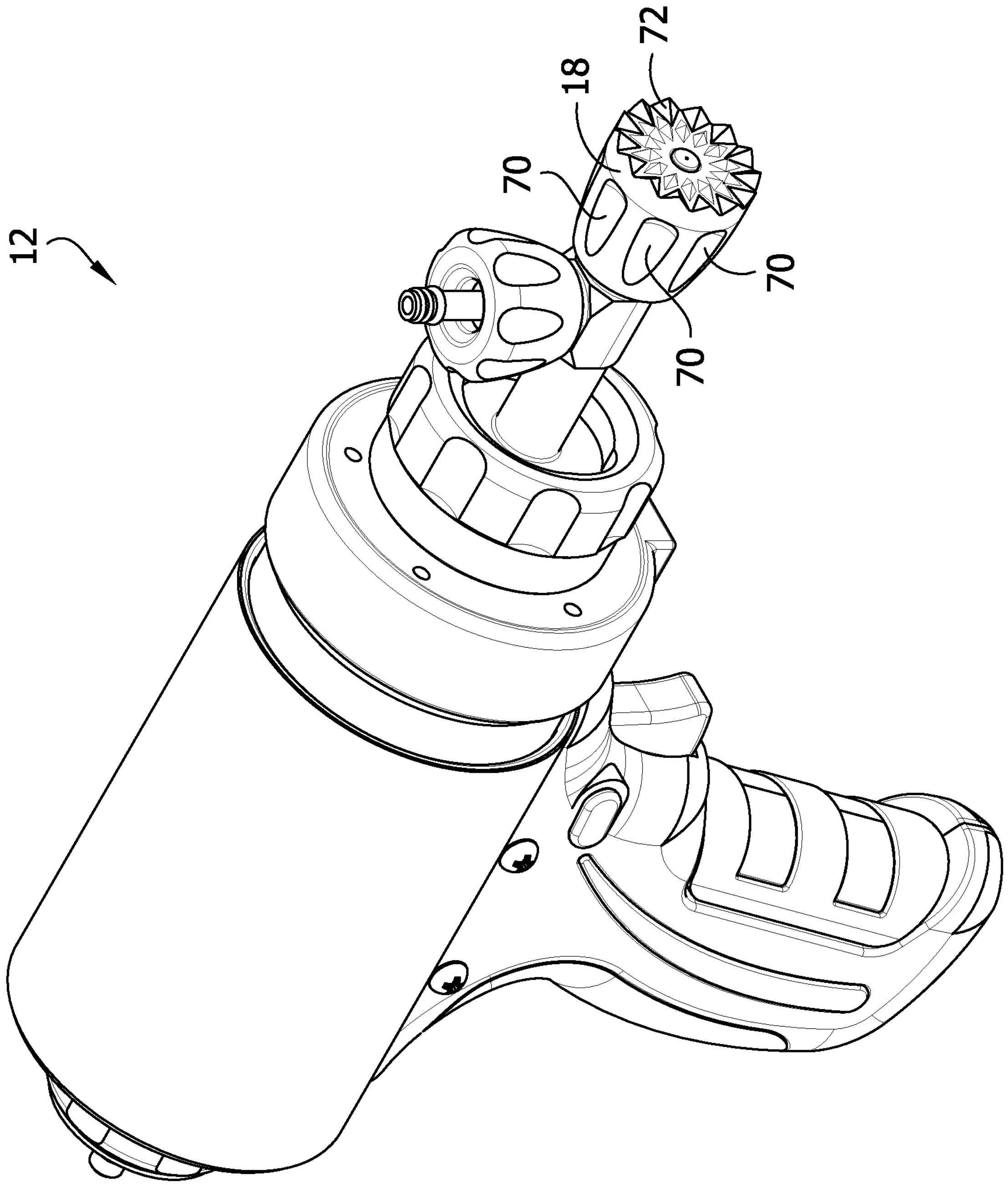
FIG. 2 is a perspective view of an exemplary embodiment of a needle-free injection device 12 of another aspect of the present invention which includes the reversible hydraulic nozzle of FIG. 1.

In another aspect, the present invention is directed to a hydraulic device that includes the reversible hydraulic nozzle of the present invention. Hydraulic devices of the present invention that include the reversible hydraulic nozzle of the present invention may be any devices that are used to dispense pressurized fluid and include, but are not necessarily limited to, aerosol sprayers (e.g., for paints or chemicals), high-pressure washers, water jet metal-cutting manufacturing tools, and needle-free injection devices. An exemplary needle-free injection device 12 of the present invention is shown in FIG. 2. Injection device 12 is operable to inject animals and humans. Although reversible hydraulic nozzle 10 is shown with needle-free injection device 12, it should be understood that reversible hydraulic nozzle 10 and other reversible hydraulic nozzles of the present invention may be used with a wide variety of hydraulic devices, including but not necessarily limited to those listed above.

Figure 3:
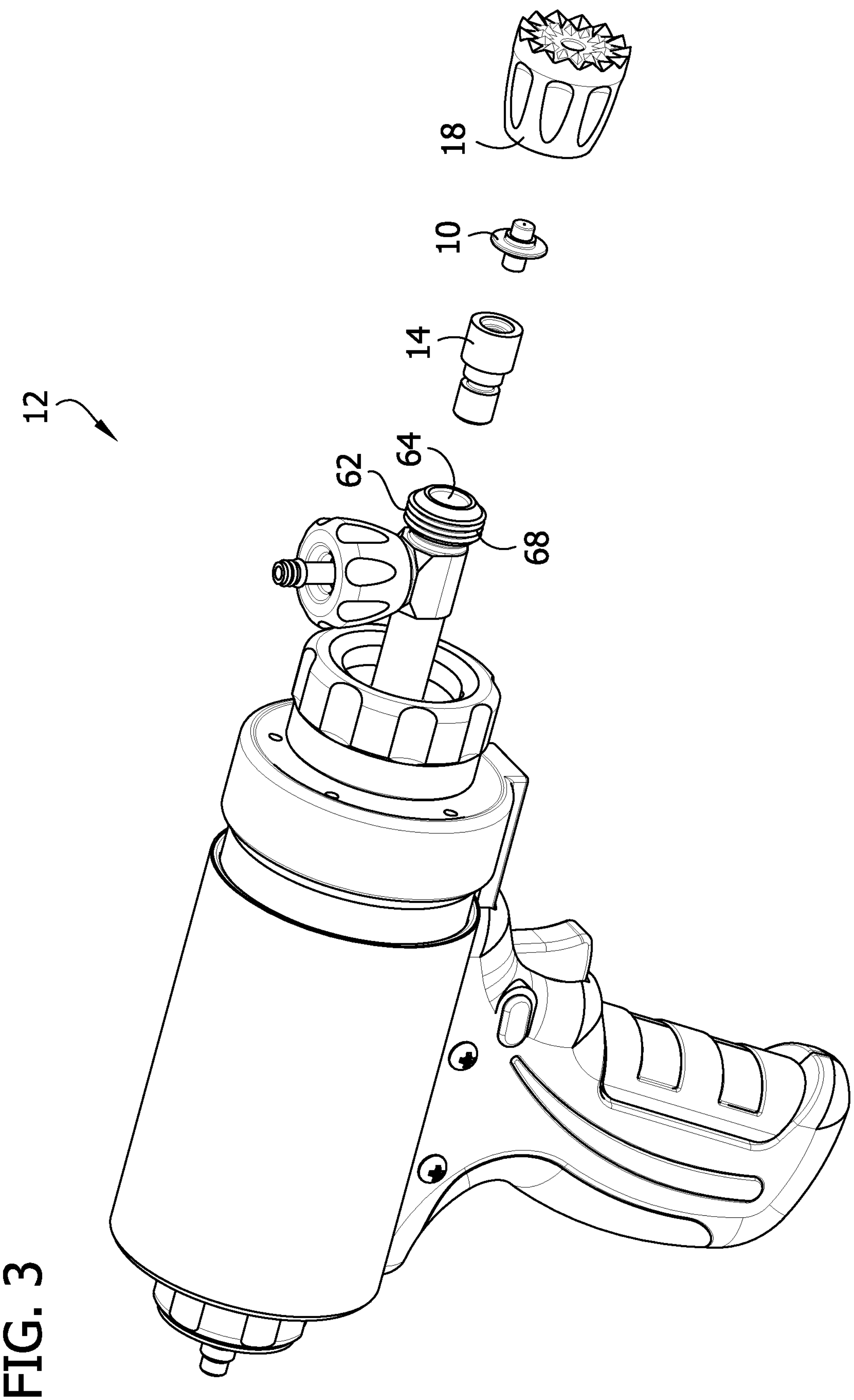
FIG. 3 is a partially exploded view of the needle-free injection device of FIG. 2.
Figure 4:
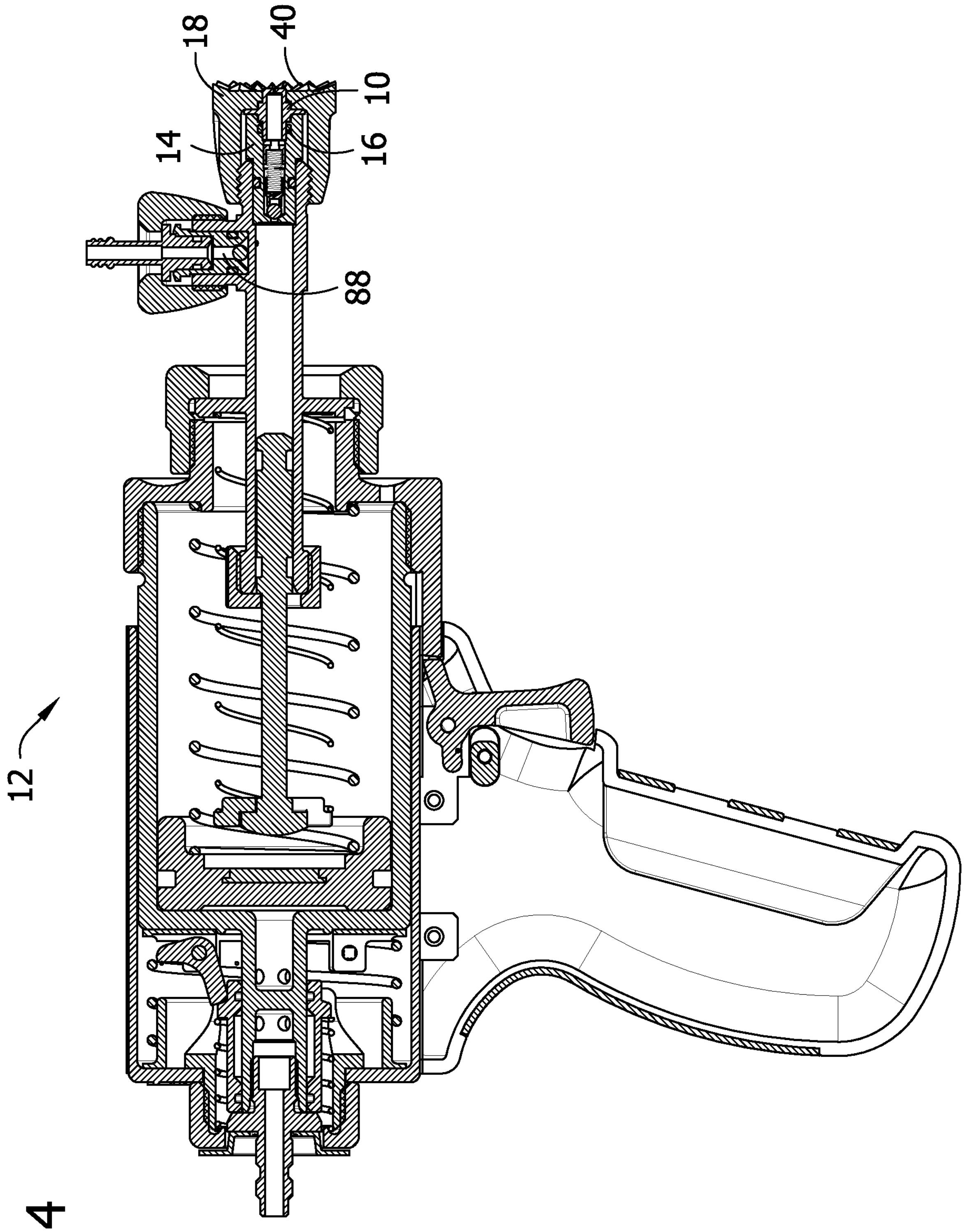
FIG. 4 is a cross-sectional view of the needle-free injection device of FIG. 2.
Figure 5A:
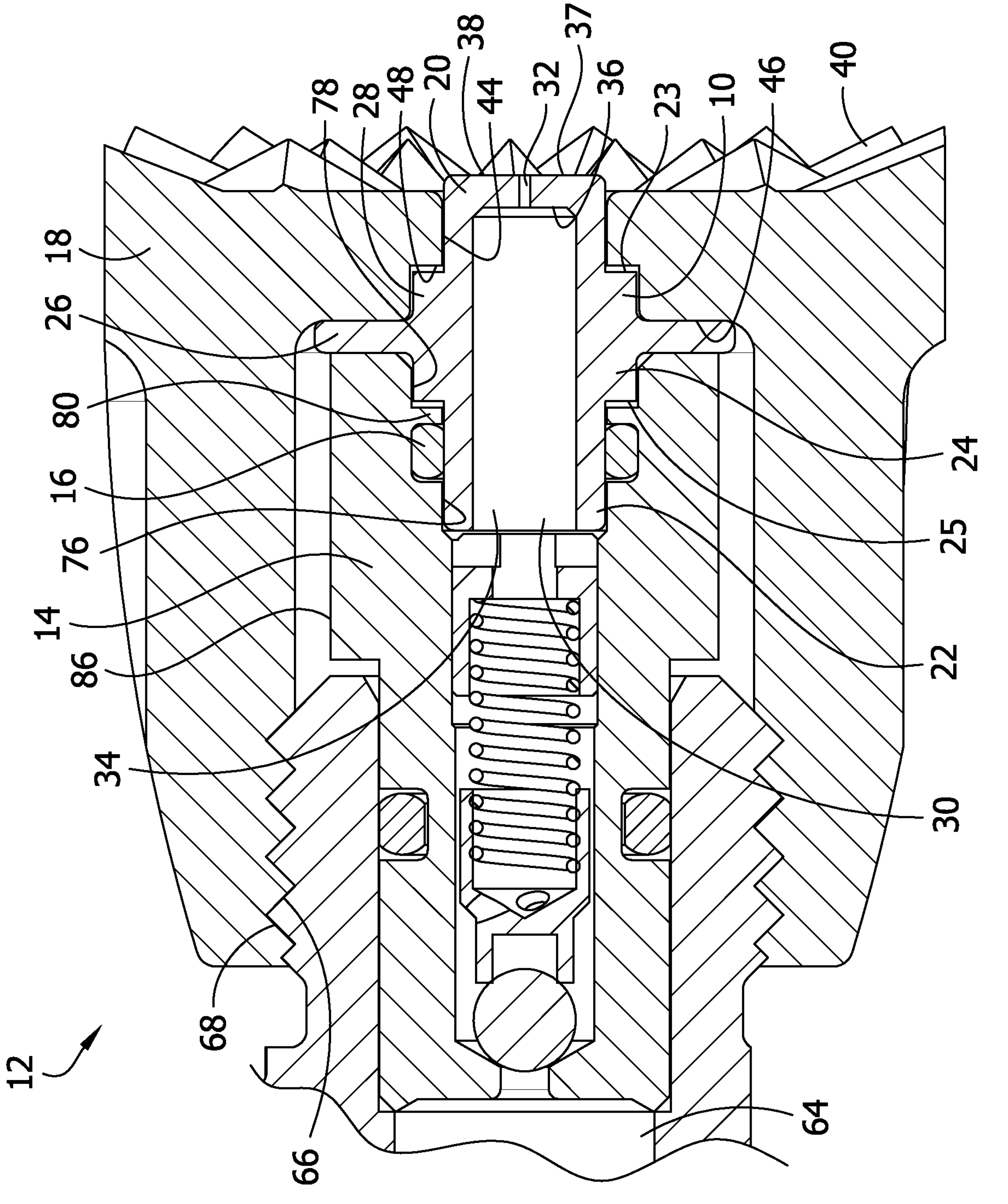
FIGS. 5A and 5B are sectional and cross-sectional views of a portion of the needle-free injection device of FIG. 2 with the reversible hydraulic nozzle positioned in the dispensing orientation.
Figure 5B:
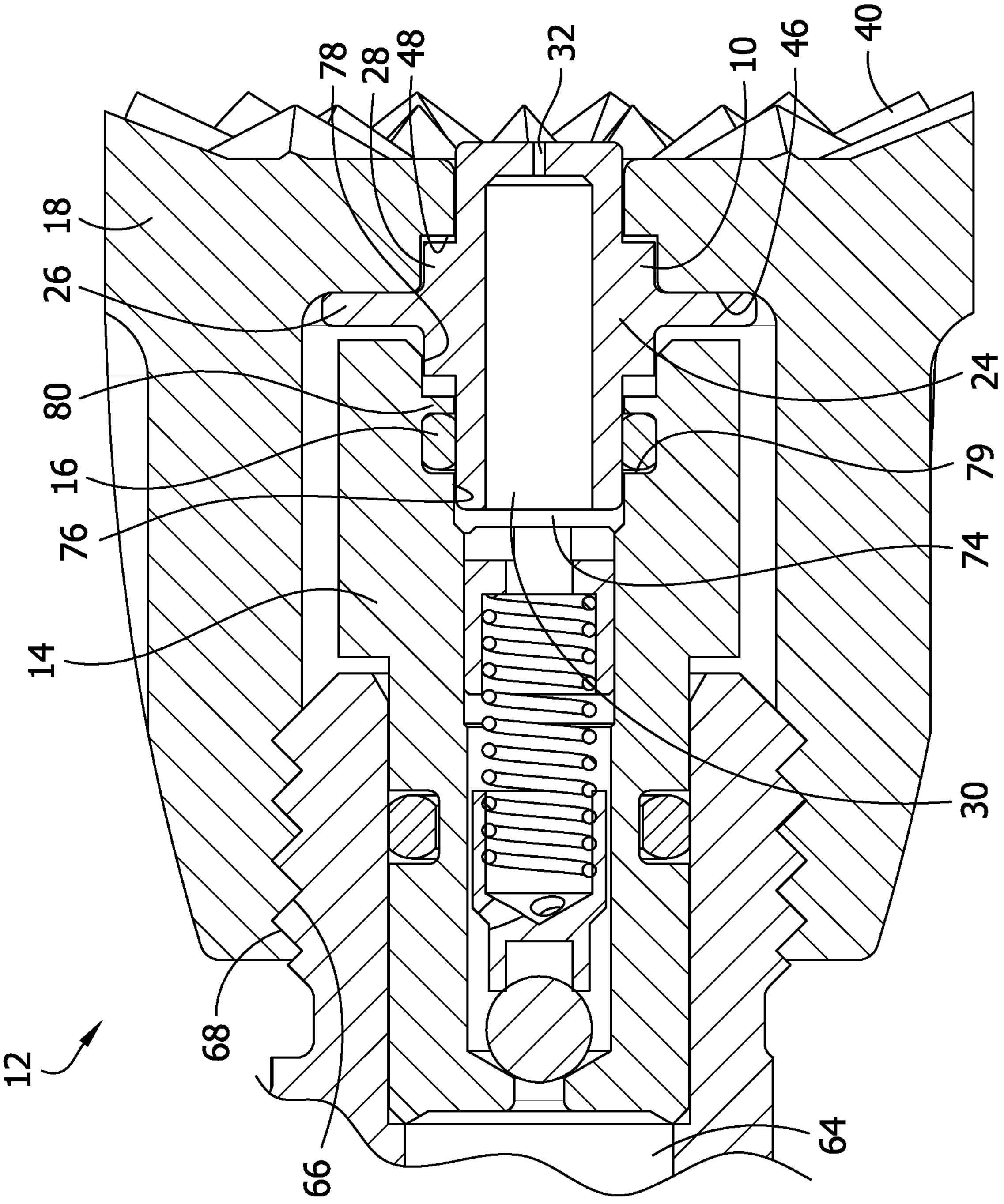
Figure 6A:
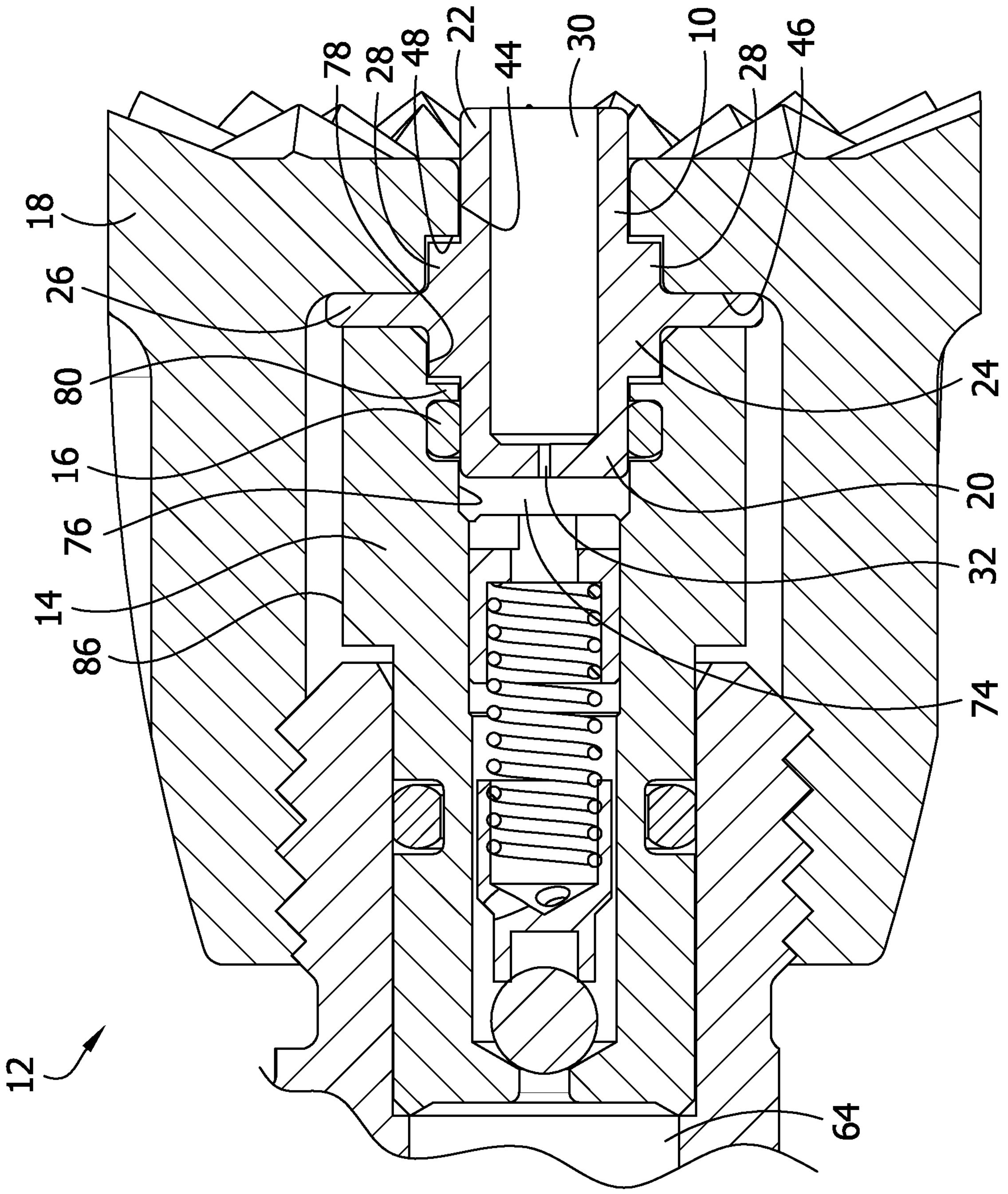
FIGS. 6A and 6B are sectional and cross-sectional views of a portion of the needle-free injection device of FIG. 2 with the reversible hydraulic nozzle positioned in the cleaning orientation.
Figure 6B:
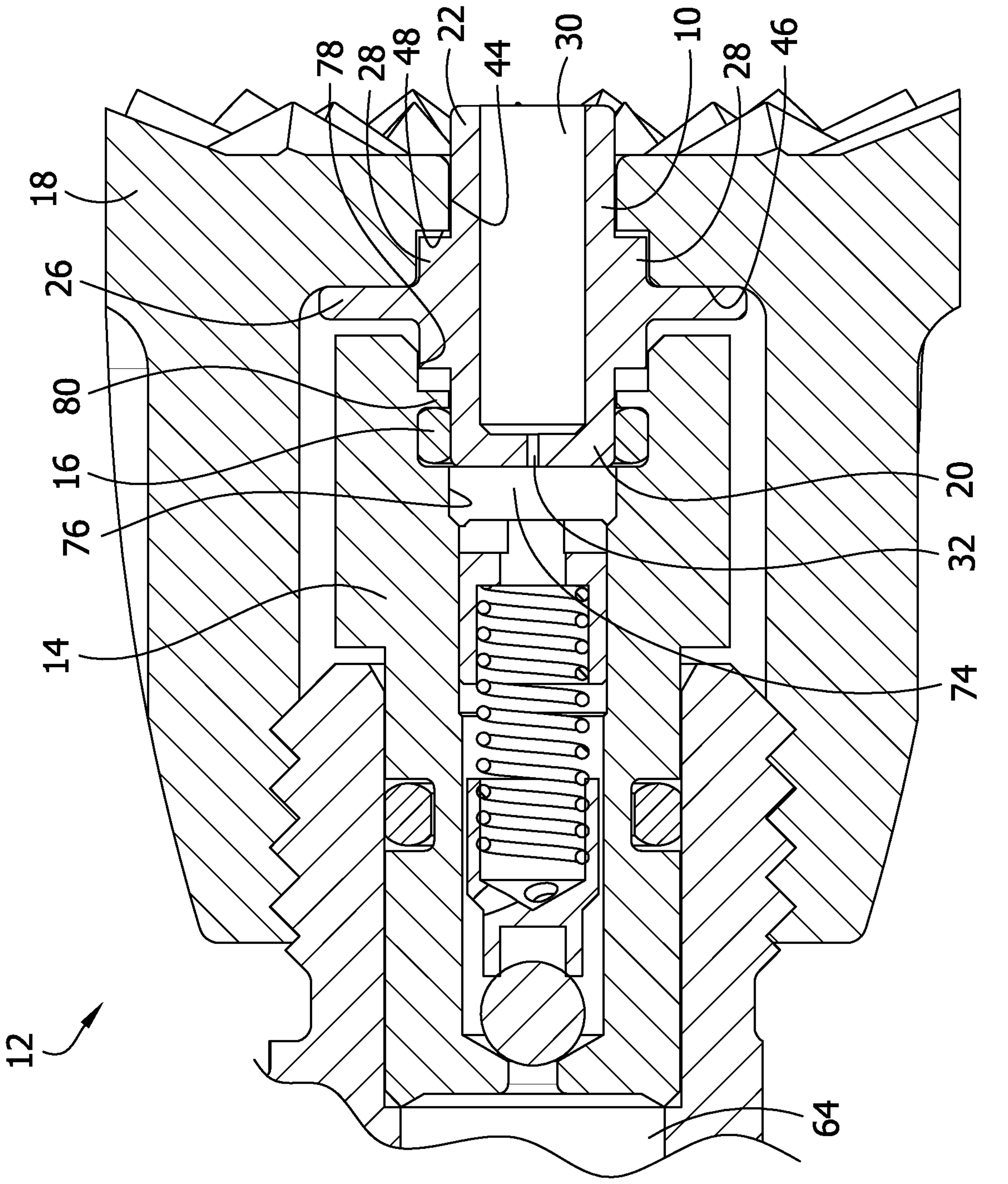

Referring to FIGS. 3 and 4, injection device 12 includes outlet valve 14, reversible hydraulic nozzle 10, O-ring 16 (best shown in FIG. 5A), and retention nut 18, all of which are positioned about a common central axis. As shown in FIGS. 5A and 5B, reversible hydraulic nozzle 10 is oriented in the dispensing orientation. In the dispensing orientation, injection device 12 is operable to inject animals and humans. Referring to FIGS. 6A and 6B, reversible hydraulic nozzle 10 is oriented in the cleaning orientation. In the cleaning orientation, injection device 12 is operable to remove any debris in reversible hydraulic nozzle 10 blocking the flow of fluid (not shown) through and/or to hydraulic orifice 32. The hydraulic power of the injection device itself can be utilized to clean debris from the hydraulic orifice, without the use of additional equipment or special cleaning tools. Once any debris is removed from reversible hydraulic nozzle 10, reversible hydraulic nozzle 10 may be moved out of the cleaning position and repositioned in the dispensing orientation.

As described herein, reversible hydraulic nozzle 10 is positionable in and movable between the dispensing orientation and the cleaning orientation. This is generally accomplished by removing reversible hydraulic nozzle 10 from injection device 12 and reversing its orientation before reinstalling it in injection device 12. Furthermore, retention nut 18 is configured to restrict movement of reversible hydraulic nozzle 10 relative to outlet valve 14 in each of the dispensing orientation and the cleaning orientation, including when pressurized fluid is expelled through outlet valve 14 and out of reversible hydraulic nozzle 10 of injection device 12. Retention nut 18 is capable of restricting movement of reversible hydraulic nozzle 10 relative to outlet valve 14 in each of the dispensing orientation and the cleaning orientation even when retention nut 18 is not tightly fastened to injection device 12. Additionally, O-ring 16 creates a fluid-tight sealed connection between outlet valve 14 and reversible hydraulic nozzle 10 in each of the dispensing orientation and the cleaning orientation, thereby preventing injectate fluid from exiting outlet valve other than via the internal fluid passageway of reversible hydraulic nozzle 10.

Referring to FIGS. 1 and 5A, reversible hydraulic nozzle 10 is integrally formed, generally cylindrical, and includes three primary sections: front body section 20, rear body section 22, and flange section 24. The components of reversible hydraulic nozzle 10 are positioned about a common central axis. Flange section 24 is positioned between front body section 20 and rear body section 22 and includes flange 26 and flange base 28, and flange 26 is positioned substantially in the center of and extends radially outward from flange base 28. Referring to FIG. 5A, reversible hydraulic nozzle 10 further includes rear opening 30 and hydraulic orifice 32. Rear opening 30 is defined by reversible hydraulic nozzle cylindrical inner wall 34 and proximal end 36 of circular front face 38 of reversible hydraulic nozzle 10. Hydraulic orifice 32 extends between proximal end 36 of front face 38 of reversible hydraulic nozzle 10 and distal end 37 of front face 38 of reversible hydraulic nozzle 10 (best shown in FIG. 1).

Rear opening 30 is in fluid communication with hydraulic orifice 32, thereby defining a fluid passageway that extends the entire length of reversible hydraulic nozzle 10. It should be understood that reversible hydraulic nozzle 10 is strong enough such that rear opening 30 and hydraulic orifice 32 are able to withstand pressures of up to 15,000 psi (approximately 1,000 bars) during operation of injection device. The diameter of rear opening 30 is larger than the diameter of hydraulic orifice 32. The diameter of hydraulic orifice 32 is preferably between 0.1 mm and 1.0 mm, more preferably between 0.1 mm and 0.5 mm, and most preferably between 0.2 mm and 0.4 mm. It should be understood that the ratio of the diameter of rear opening 30 to the diameter of hydraulic orifice 32 can vary significantly. For example, if hydraulic orifice 32 is relatively large (e.g., 0.5 mm to 1.0 mm), the ratio may be approximately 5:1 to 10:1. Conversely, if hydraulic orifice 32 is relatively small (e.g., 0.1 mm to 0.4 mm), the ratio may be approximately 15:1 to 20:1.

As best shown in FIG. 5A, front body section 20 of reversible hydraulic nozzle 10 is shorter in length than rear body section 22 of reversible hydraulic nozzle 10. However, it is contemplated that in other embodiments the front body section of the reversible hydraulic nozzle of the present invention can be equal in length to or longer than its rear body section. For example, the length of front body section of the reversible hydraulic nozzle of the present invention can vary from approximately 2 mm to approximately 15 mm, and the length of its rear body section can vary from approximately 2 mm to approximately 10 mm. A reversible hydraulic nozzle of the present invention with a front body section that is longer than the rear body section may be preferred in applications where it is desirable for the front body section to protrude farther outward from distal contact end of retention nut 18. Such embodiments may be desirable for penetrating a fur coat or another superficiality that impedes direct contact between reversible hydraulic nozzle 10 and an injection site of a subject.

Referring to FIG. 5A, front body section 20 and rear body section 22 are substantially equal in width or diameter. The diameter of flange base 28 is greater than the diameter of front body section 20 and rear body section 22 such that flange base 28 includes front sidewall 23 adjacent front body section 20 and rear sidewall 25 adjacent rear body section 22.

Figure 7:
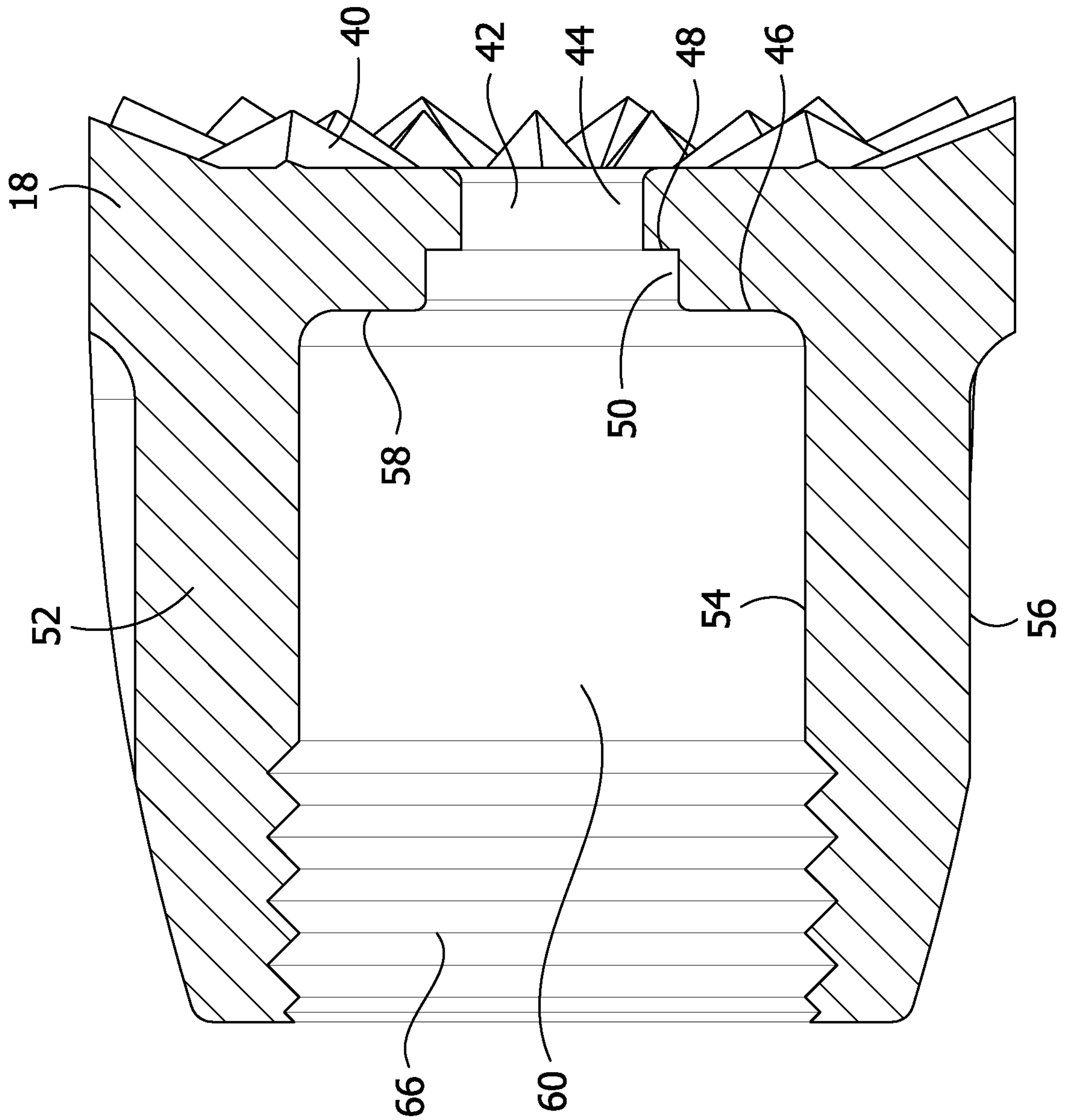
FIG. 7 is a cross-sectional view of the retention nut of the needle-free injection device shown in FIG. 2.

Referring to FIG. 7, retention nut 18 includes contact end 40, reversible hydraulic nozzle opening 42 positioned in distal contact end 40 and defined by cylindrical retention alignment wall 44, retaining wall 46, and depressed retaining wall 48 which defines retaining depression 50. Retention nut 18 further includes sidewall 52. Interior surface 54 of sidewall 52 and a proximal end 58 of contact end 40 define valve cavity 60. Exterior surface 56 of sidewall 52 is generally frustoconical and has a larger diameter at distal contact end 40) than at its most proximal end. Interior surface 54 of sidewall 52 is generally cylindrical and is wide enough that sidewall 52 can be slidably positioned over reversible hydraulic nozzle 10 and outlet valve 14. As will be readily understood and as shown in FIGS. 3 and 7, retention nut 18 and exterior cylindrical wall 62 of dose chamber 64 of injection device 12 each include respective threads 66, 68 which rotationally engage with one another to removably attach retention nut to injection device 12. Rotationally engaged threads 66, 68 are shown in FIG. 5A. Referring to FIG. 2, retention nut 18 includes a plurality of indentations 70 spaced apart from one another about exterior surface 56 of sidewall 52 to provide traction for a user to assist with tightening and untightening retention nut 18 to and from dose chamber 64. Retention nut 18 further includes protrusions 72 on contact end 40 which provide traction when injection device 12 is pressed against a subject to be injected.

It will be appreciated that retention nut 18 is configured to removably attach or fasten to dose chamber 64 via threaded engagement and to restrict movement of reversible hydraulic nozzle 10 relative to outlet valve 14 in each of the dispensing orientation and the cleaning orientation when injection device 12 is actuated and fluid is expelled through outlet valve 14 and out of reversible hydraulic nozzle 10 at a high pressure. Although injection device 12 is shown with retention nut 18, it should be understood that any suitable fastener may be utilized to restrict movement of reversible hydraulic nozzle 10 relative to outlet valve 14, including when pressurized fluid is expelled from outlet valve 14 and out of reversible hydraulic nozzle 10. Suitable alternative fasteners include, but are not necessarily limited to, retaining pins, ball locks, or any other fastener capable of engaging dose chamber 64 in a manner analogous to the threaded engagement described herein.

In the dispensing orientation shown in FIGS. 5A and 5B, rear body section 22 of reversible hydraulic nozzle 10 is more proximal to outlet valve 14 than front body section 20. Preferably, as shown, rear body section 22 is in contact with outlet valve 14. More preferably, as shown, rear body section is slidably positioned within cylindrical valve opening 74 (defined by inner cylindrical outlet valve alignment wall 76 of outlet valve 14) in the dispensing orientation and is in abutting contact with inner cylindrical outlet valve alignment wall 76 of outlet valve 14. Referring to FIG. 5A, front body section 20 of reversible hydraulic nozzle 10 is slidably positioned within reversible hydraulic nozzle opening 42 (best shown in FIG. 7) and is in abutting contact with cylindrical retention alignment wall 44.

In the cleaning orientation shown in FIGS. 6A and 6B, front body section 20 of reversible hydraulic nozzle 10 is more proximal to outlet valve 14 than rear body section 22. Preferably, as shown, front body section 20 is in contact with outlet valve 14. More preferably, as shown, front body section 20 of reversible hydraulic nozzle 10 is slidably positioned within cylindrical valve opening 74 and is in abutting contact with inner cylindrical outlet valve alignment wall 76 of outlet valve 14. Rear body section 22 of reversible hydraulic nozzle is slidably positioned within reversible hydraulic nozzle opening 42 (best shown in FIG. 7) and is in abutting contact with cylindrical retention alignment wall 44.

Reversible hydraulic nozzle 10 can be interchangeably positioned in the dispensing orientations and cleaning orientations as described above and shown in FIGS. 5A and 5B (dispensing orientation) and 6A and 6B (cleaning orientation) due in part to the fact that front body section 20 and rear body section 22 are approximately equal in width or diameter to one another. As a result, they can be interchangeably and slidably positioned within cylindrical valve opening 74 of outlet valve 14 (best shown in FIGS. 5B, 6A, and 6B) and hydraulic nozzle opening 42 (shown in FIG. 7), which are also approximately equal in width or diameter to one another. Moreover, with reference to FIGS. 5A, 5B, 6A, and 6B, flange base 28 of flange section 24 of reversible hydraulic nozzle 10 can be slidably positioned inside outer cylindrical nozzle alignment wall 78 of outlet valve 14 when reversible hydraulic nozzle 10 is positioned in each of the dispensing orientation and the cleaning orientation. Likewise, flange base 28 can be slidably positioned inside retaining depression 50 in retention nut 18 (best shown in FIG. 7) in each of the dispensing orientation and the cleaning orientation.

Referring to FIG. 5B, O-ring 16 distal end 80is fixedly attached to and abuttingly engaged with outer cylindrical nozzle alignment wall 78, and its inner diameter is substantially identical to cylindrical valve opening 74. O-ring 16 is positioned in a cylindrical recess 77 formed in outer cylindrical nozzle alignment wall 78. Proximal end wall 79 and distal end wall 80 of cylindrical recess 77 function to help prevent movement of O-ring 16 relative to outlet valve 14. In the dispensing orientation shown in FIGS. 5A and 5B, rear body section 22 of reversible hydraulic nozzle 10 is slidably positioned within and in abutting engagement with O-ring 16 and distal end 80. Similarly, in the cleaning orientation shown in FIGS. 6A and 6B, front body section 20 of reversible hydraulic nozzle 10 is slidably positioned within and in abutting engagement with O-ring 16 and distal end 80. Referring to FIGS. 5A and 5B (dispensing orientation) and 6A and 6B (cleaning orientation), O-ring 16 creates a fluid-tight sealed connection between outlet valve 14 and reversible hydraulic nozzle 10, thereby preventing fluid (not shown) from exiting outlet valve 14 other than through the fluid passageway defined by and extending between rear opening 30 and hydraulic orifice 32 of reversible hydraulic nozzle 10.

As shown in FIGS. 5A and 6A, when reversible hydraulic nozzle 10 is in either the dispensing orientation or the cleaning orientation, retention nut 18 may be sufficiently tightened onto dose chamber 64 of injection device 12 such that flange 26 of reversible hydraulic nozzle 10 is in abutting engagement with both retaining wall 46 and the distal end of outlet valve 14. As a result, reversible hydraulic nozzle 10 is rendered immobile with respect to outlet valve 14.

However, it should be understood that reversible hydraulic nozzle 10 need not be fully inserted within outlet valve 14 or rendered immobile with respect to outlet valve 14 in order for O-ring 16 to create a fluid-tight sealed connection between outlet valve 14 and reversible hydraulic nozzle 10. Thus, it is contemplated that injection device 12 can still function optimally when reversible hydraulic nozzle 10 is in either the dispensing orientation or the cleaning orientation even if retention nut 18 is not fully or tightly fastened to dose chamber 64. For example, as shown in FIG. 5B, reversible hydraulic nozzle 10 is in the dispensing orientation, yet retention nut 18 is not fully fastened to dose chamber 64. Reversible hydraulic nozzle 10 is movable with respect to outlet valve 14 as evidenced by the fact that flange 26 is spaced apart from a distal end of outlet valve 14. As another example, as shown in FIG. 6B, reversible hydraulic nozzle 10 is in the cleaning orientation, yet retention nut 18 is not fully fastened to dose chamber 64. Reversible hydraulic nozzle 10 is movable with respect to outlet valve 14 as evidenced by the fact that flange 26 is spaced apart from a distal end of outlet valve 14. Even when retention nut 18 is not tightly fastened to dose chamber 64 as shown in FIGS. 5B and 6B, retention nut 18 still restricts movement of reversible hydraulic nozzle 10 relative to outlet valve, and O-ring 16 creates a fluid-tight sealed connection between outlet valve 14 and reversible hydraulic nozzle 10.

It should be understood that flange section 24 is configured to engage with retention nut 18 so that retention nut 18 can restrict movement of reversible hydraulic nozzle 10 relative to outlet valve in each of the dispensing orientation and the cleaning orientation. As shown in FIGS. 5A, 5B, 6A, and 6B, the engagement of flange 26 with retaining wall 46 and the engagement of flange base 28 with depressed retaining wall 48 This is true regardless of whether retention nut 18 is fully or partially fastened to injection device 12. It should further be understood that flange section 24 could be modified to omit flange 26 (while retaining flange base 28) or to omit flange base 28 (while retaining flange 26) without departing from this function. Such changes may, but need not necessarily, require changes to retention nut 18.

It should also be understood that retention nut 18 (or any other suitable fastener) and/or reversible hydraulic nozzle 10 may be modified such that retention nut 18 is configured to engage a portion of reversible hydraulic nozzle 10 other than flange section 24 in order to restrict movement of reversible hydraulic nozzle 10 relative to outlet valve in each of the dispensing orientation and the cleaning orientation. For example, retention nut 18 (or any other suitable fastener)

may be modified to engage with front body section 20 and rear body section 22 in the respective dispensing orientation and cleaning orientation. In such embodiments, reversible hydraulic nozzle 10 may be modified to omit flange base 28 and/or flange 26 of flange section 24.

Figure 8:
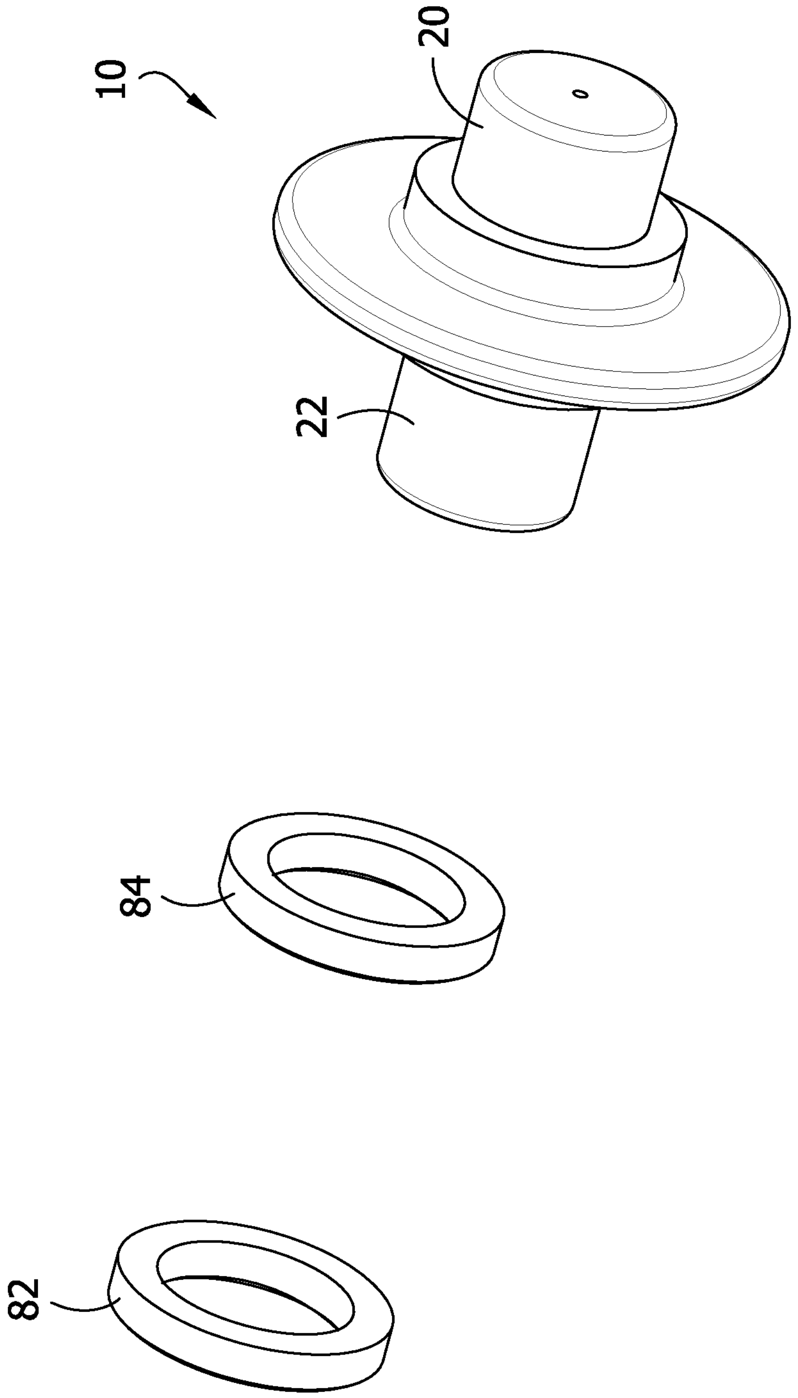
FIG. 8 is an exploded view of the reversible hydraulic nozzle of FIG. 1 and an alternative O-ring and backup ring for use with an alternative embodiment of the needle-free injection device shown in FIG. 2.

It should further be understood that, in an alternative embodiment of injection device 12, O-ring 16 need not be fixedly attached to outer cylindrical nozzle alignment wall 78 of outlet valve 14 as shown in FIG. 5B. Alternative O-ring 82 is shown in FIG. 8. O-ring 82 may be used with an alternative embodiment of injection device 12 (not shown) wherein cylindrical recess 77 formed in outer cylindrical nozzle alignment wall 78 is wider than shown such that it extends between proximal end wall 79 of cylindrical recess 77 and the most distal portion of outlet valve 14: in other words, such an alternative embodiment does not include distal end wall 80 of cylindrical recess 77. Referring back to FIG. 8, backup ring 84 is functionally equivalent to distal end 80 of cylindrical recess 77 of outlet valve 14. As shown, O-ring 82 and backup ring 84 may be slidably positioned over rear body section 22 of reversible hydraulic nozzle 10 so that reversible hydraulic nozzle 10 may be positioned in the dispensing orientation. It will also be understood that O-ring 82 and backup ring 84 may be slidably positioned over front body section 20 of reversible hydraulic nozzle so that reversible hydraulic nozzle may be positioned in the cleaning orientation. It will further be understood that rear sidewall 25 (shown in FIG. 5A) of flange base 28 of reversible hydraulic nozzle 10 functions to restrict movement of O-ring 82 and backup ring 84 relative to outlet valve in the dispensing orientation. Similarly, front sidewall 23 (also shown in FIG. 5A) functions to restrict movement of O-ring 82 and backup ring 84 relative to outlet valve in the cleaning orientation.

It should additionally be understood that any seal configured to create a fluid-tight sealed connection between reversible hydraulic nozzle 10 and outlet valve 14 may be substituted for O-rings 16, 82. Suitable seals include, but are not necessarily limited to, U-cup seals, quad seals or any other functional alternative to an O-ring.

Moreover, referring to FIG. 5A, in certain embodiments not shown, rear body section 22 of reversible hydraulic nozzle 10 may be configured to be slidably positioned over outer wall 86 of outlet valve 14 in the dispensing orientation rather than within cylindrical valve opening 74. In such a configuration (not shown), O-ring 16 would be positioned between and in abutting contact with outer wall 86 of outlet valve 14 and cylindrical inner wall 34 of rear body section 22 of reversible hydraulic nozzle 10. Moreover, referring to FIG. 6A, in certain embodiments, front body section 20 may be configured to be slidably positioned over outer wall 86 of outlet valve 14 in the cleaning orientation rather than within cylindrical valve opening 74. In such a configuration (not shown), O-ring 16 would be positioned between and in abutting contact with outer wall 86 of outlet valve 14 and cylindrical inner wall 34 of front body section 20 of reversible hydraulic nozzle 10

As noted above, the reversible hydraulic nozzle of the present invention can readily be adapted for use with a wide variety of hydraulic devices used to dispense pressurized fluid. It should further be noted that, while reversible hydraulic nozzle 10 is shown in use with needle-free injection device 12, the reversible hydraulic nozzle of the present invention is usable with a wide variety and various types of needle-free injection devices.

The dispensing action of an injection device of the present invention and a method of using the same to administer an injection will now be described with respect to the exemplary embodiment depicted in the Figures. Prior to use, the components of injection device are in the positions shown in FIG. 4, with reversible hydraulic nozzle 10 positioned in the dispensing orientation. As described above, retention nut 18 may be tightly or loosely fastened to dose chamber 64 as shown in FIGS. 5B and 5A. A fluid (not shown) is loaded into dose chamber 64 for injection. This may be achieved, for example, by drawing fluid (not shown) into dose chamber 64 via inlet valve 88 (shown in FIG. 4). Referring to FIGS. 5A and 5B, a user of injection device 12 then presses distal contact end 40 of retention nut 18 against a subject to be injected at a target injection site (not shown). Once the injection device 12 is positioned for injection, it is actuated in a manner similar to that described in PCT/US2020/034118 (Publication No. WO 2021/236092 A1) which is incorporated herein by reference in its entirety. Once injection device 12 has been actuated, the fluid, now pressurized, passes through outlet valve 14 and into rear opening 30. The fluid exits reversible hydraulic nozzle 10 through hydraulic orifice 32, and enters the subject. O-ring 16 prevents the fluid from exiting outlet valve 14 other than via the internal fluid passageway of reversible hydraulic nozzle 10.

Figure 9:
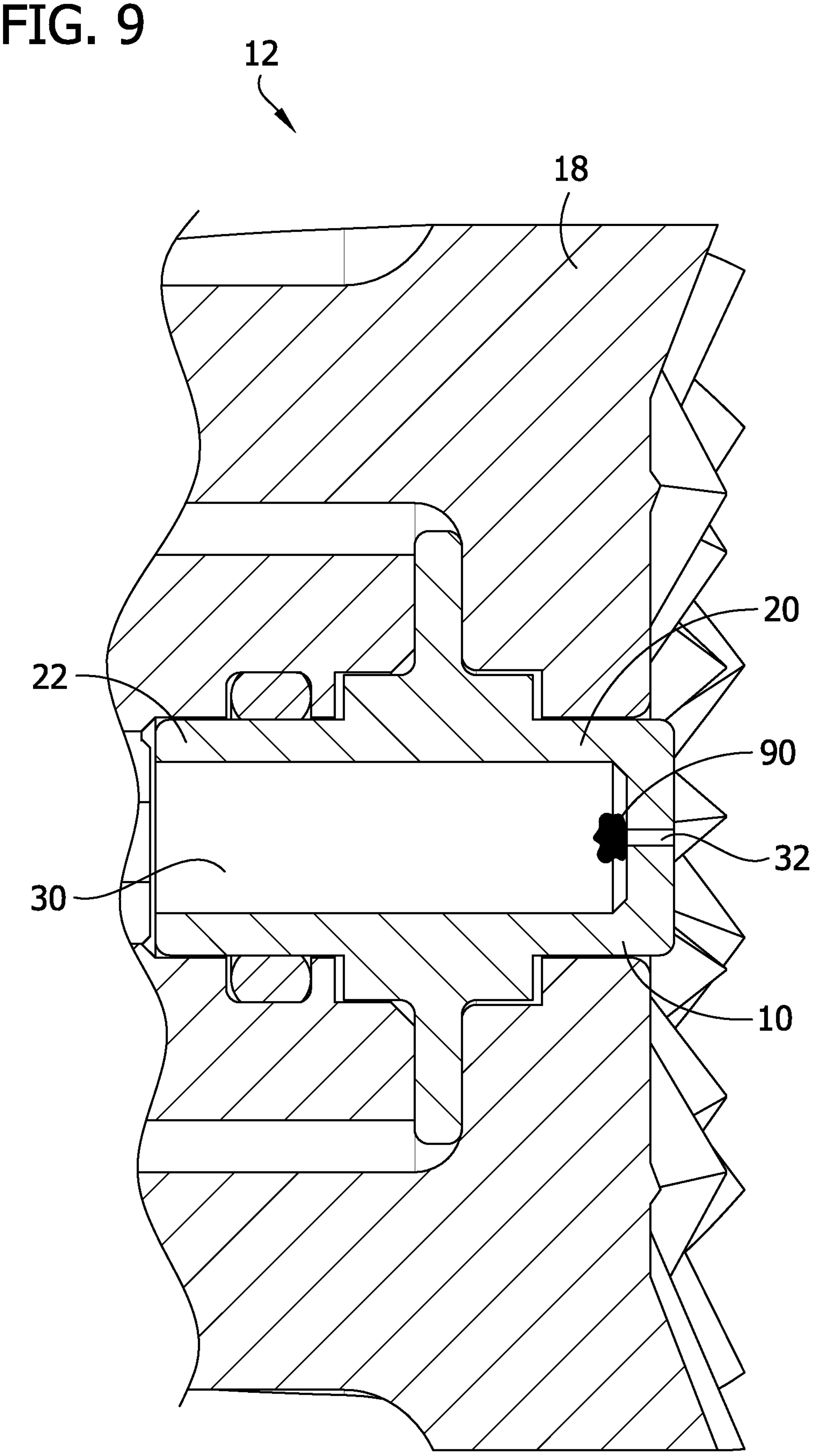
FIG. 9 is a sectional and cross-sectional view of a portion of the needle-free injection device of FIG. 2 with the reversible hydraulic nozzle positioned in the dispensing orientation.

Over time, reversible hydraulic nozzle 10 may accumulate debris through regular use of injection device 12 to perform injections with reversible hydraulic nozzle 10 installed in the dispensing orientation. This debris may completely or partially block the fluid passageway of reversible hydraulic nozzle 10. Referring to FIG. 9, exemplary debris 90 is shown to be positioned in rear opening 30 such that it would block flow of fluid (not shown) either into or out of hydraulic orifice 32. By removing reversible hydraulic nozzle 10 from injection device 12 and reinstalling reversible hydraulic nozzle 10 in the cleaning orientation shown in FIG. 6A or 6B, a user can operate injection device 12 to pass a fluid (not shown) through hydraulic orifice 32 and into rear opening 30 in order to break down and/or to expel debris 90.

The cleaning action of an injection device of the present invention and a method of using the same to remove debris from reversible hydraulic nozzle 10 will now be described with respect to the exemplary embodiment depicted in the Figures. A user may remove retention nut 18 and reversible hydraulic nozzle 10 from the position shown in FIG. 9. A user may then reposition reversible hydraulic nozzle 10 in the cleaning orientation. As described herein, retention nut 18 may then be loosely or tightly fastened to dose chamber 64 as shown in FIGS. 6B and 6A. A fluid (not shown) is loaded into dose chamber 64 in preparation for actuation. Without being pressed against a subject, injection device 12 is actuated in a manner similar to that described in PCT/US2020/034118 (Publication No. WO 2021/236092 A1). The actuation of injection device 12 causes the fluid, now pressurized, to pass through outlet valve 14 and into hydraulic orifice 32. The high velocity of the fluid as it exits hydraulic orifice 32 and enters rear opening 30 breaks apart and/or expels debris 90, thereby clearing debris 90 from reversible hydraulic nozzle 10. O-ring 16 prevents the fluid from exiting outlet valve 14 other than via the internal fluid passageway of reversible hydraulic nozzle 10. Reversible hydraulic nozzle 10 is now clean and ready for further use in the dispensing orientation.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

Further, it is to be understood that relative terms such as "front" and "rear" are used for illustrative purposes only and are not to be understood as restricting the orientation of a component thus described.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

I claim:

1. A reversible hydraulic nozzle, comprising:

a front body section comprising a hydraulic orifice; and a rear body section comprising a rear opening; and a flange section positioned between the front and the rear body section; and wherein the reversible hydraulic nozzle is configured to be in fluid communication with an outlet valve of a hydraulic device in each of a dispensing orientation and a cleaning orientation;

wherein the flange section is configured to engage with a fastener of the hydraulic device in order that the fastener restricts movement of the reversible hydraulic nozzle relative to the outlet valve in each of the dispensing orientation and the cleaning orientation; and wherein the front body section is configured to be in contact with the outlet valve of the hydraulic device in the cleaning orientation.

2. The reversible hydraulic nozzle of claim 1, wherein the hydraulic orifice has a first diameter, wherein the rear opening has a second diameter, and wherein the second diameter is larger than the first diameter.

3. The reversible hydraulic nozzle of claim 2, wherein the first diameter is from about 0.1 mm to 1.0 mm.

4. The reversible hydraulic nozzle of claim 2, wherein the first diameter is from about 0.1 mm to 0.5 mm.

5. The reversible hydraulic nozzle of claim 2, wherein the first diameter is from about 0.2 mm to 0.4 mm.

6. The reversible hydraulic nozzle of claim 2, wherein a ratio of the second diameter to the first diameter is about 5:1 to 10:1.

7. The reversible hydraulic nozzle of claim 2, wherein a ratio of the second diameter to the first diameter is about 15:1 to 20:1.

8. The reversible hydraulic nozzle of claim 1, wherein the rear body section is configured to be more proximal to the outlet valve of the hydraulic device than the front body section in the dispensing orientation.

9. The reversible hydraulic nozzle of claim 1, wherein the rear body section is configured to be in contact with the outlet valve of the hydraulic device in the dispensing orientation.

10. The reversible hydraulic nozzle of claim 1, wherein the rear body section is configured to be slidably positioned within the outlet valve of the hydraulic device in the dispensing orientation.

11. The reversible hydraulic nozzle of claim 1, wherein the rear body section is configured to be slidably positioned over the outlet valve of the hydraulic device in the dispensing orientation.

12. The reversible hydraulic nozzle of claim 1, wherein the front body section is configured to be more proximal to the outlet valve than the rear body section in the cleaning orientation.

13. The reversible hydraulic nozzle of claim 1, wherein the front body section is configured to be slidably positioned within the outlet valve of the hydraulic device in the cleaning orientation.

14. The reversible hydraulic nozzle of claim 1, wherein the front body portion is configured to be slidably positioned over the outlet valve of the hydraulic device in the cleaning orientation.

15. The reversible hydraulic nozzle of claim 1, wherein a front width of the front body section is substantially the same as a rear width of the rear body section.

16. The reversible hydraulic nozzle of claim 1, wherein a front diameter of the front body section is substantially the same as a rear diameter of the rear body section.

17. The reversible hydraulic nozzle of claim 1, wherein the fastener is selected from the group consisting of a retention nut, a retaining pin, and a ball lock.

18. The reversible hydraulic nozzle of claim 17, wherein the fastener is a retention nut.

19. The reversible hydraulic nozzle of claim 1, wherein the hydraulic device is selected from the group consisting of high-pressure washers, water jet metal-cutting manufacturing tools, aerosol spray devices, and needle-free injection devices.

* * * * *